United States Patent
Grosskopf

(10) Patent No.: US 6,525,828 B1
(45) Date of Patent: *Feb. 25, 2003

(54) CONFOCAL COLOR

(76) Inventor: Rudolf Grosskopf, Eschenweg 11, D-89551 Konigsbronn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,037

(22) Filed: Mar. 30, 2000

(30) Foreign Application Priority Data

Apr. 23, 1999 (DE) .......................................... 199 18 689

(51) Int. Cl.⁷ .............................................. G01B 11/24
(52) U.S. Cl. ...................... 356/613; 359/397; 359/619; 359/626; 250/234
(58) Field of Search ................................ 357/368, 385, 357/397; 356/376, 371, 445, 446, 448, 616, 622, 601, 603, 604, 606, 613, 600; 250/201.3, 234

(56) References Cited

U.S. PATENT DOCUMENTS

| 5,239,178 A | 8/1993 | Derndinger et al. |
| 5,587,832 A | * 12/1996 | Krause ........................ 359/385 |
| 5,877,807 A | 3/1999 | Lenz |
| 5,978,095 A | * 11/1999 | Tanaami ...................... 356/445 |
| 6,031,661 A | * 2/2000 | Tanaami ...................... 359/368 |
| 6,111,690 A | * 8/2000 | Tanaami ...................... 359/368 |
| 6,226,036 B1 | 5/2001 | Grosskopf |
| 6,252,717 B1 | 6/2001 | Grosskopf |

FOREIGN PATENT DOCUMENTS

| DE | 3837063 C1 | 3/1990 |
| DE | 4113279 C2 | 8/1996 |
| DE | 19648316 C1 | 4/1998 |

* cited by examiner

*Primary Examiner*—Hoa Q. Pham
(74) *Attorney, Agent, or Firm*—Hale and Dorr LLP

(57) ABSTRACT

An apparatus for examining an object in three dimensions including an optical system having an illumination side and an observation side; an illumination grid located in an illumination plane on the illumination side of the optical system and which during use generates an array of illumination points that is projected by the optical system onto a focus plane at a site at which the object is located, the optical system in turn directing light from that site into an observation plane on the observation side of the optical system, the illumination grid being a first aperture plate having a first passive array of pinholes; a detector array of light-sensitive regions located on the observation side of the optical system; and a second aperture plate located between the detector array and the optical system, said second aperture plate having a second passive array of pinholes.

13 Claims, 3 Drawing Sheets

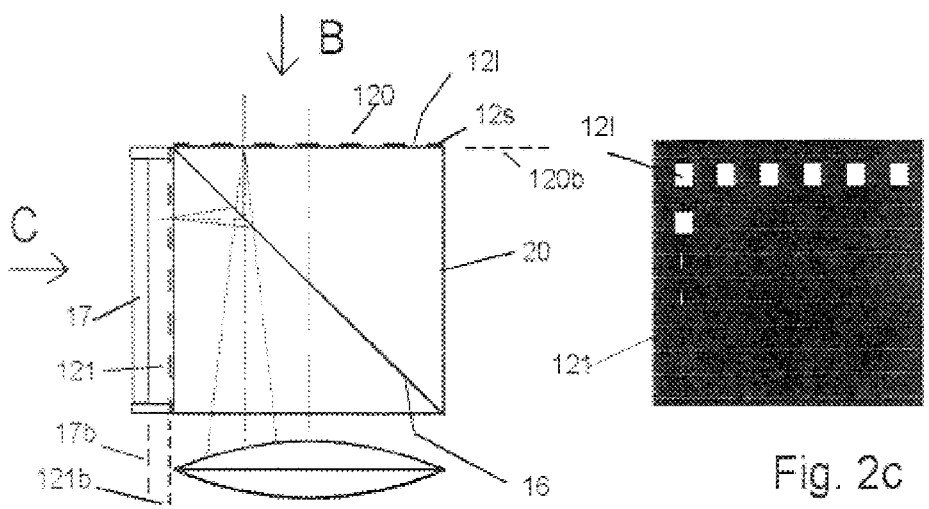
Fig. 2a
Fig. 2c
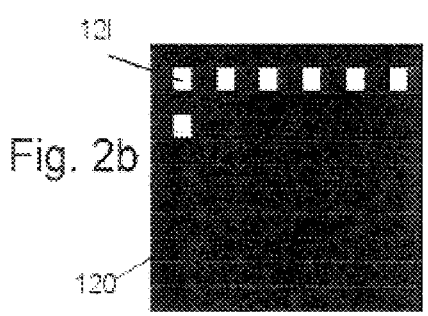
Fig. 2b
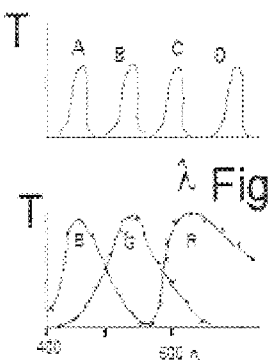
Fig. 4a
Fig. 4b
Fig. 5a
Fig. 5b
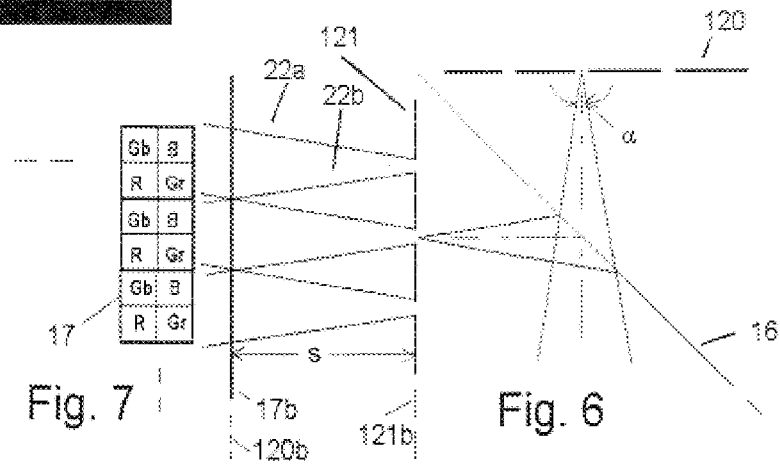
Fig. 7
Fig. 6

CONFOCAL COLOR

FIELD OF THE INVENTION

This invention relates to a device for examining an object in three dimensions.

BACKGROUND

In confocal microscopy, an object is illuminated in known fashion through an aperture diaphragm and the illuminated point is observed by a radiation detector for which the light-sensitive surface is just as small as the illuminated point (Minsky, M., U.S. Pat. No. 3,013,467 and Minsky, M., Memoir on inventing the confocal scanning microscope. Scanning 10, p. 128–138). Compared to conventional microscopy, confocal microscopy has the advantage of delivering resolution in depth (measurement of the z axis) and of creating little scattered light during imaging. Only the plane of the object in focus is brightly illuminated. Object planes above or below the focus plane receive much less light. The image is built up through a scanning process. One or more points may be illuminated and observed simultaneously.

Three scanning methods are well known: mirror scanning, Nipkow disk, and electronic scanning using a matrix detector. Additional details on prior art relating to scanning with a mirror or Nipkow disk may be found in the *Handbook of Biological Confocal Microscopy*, Plenum Press, New York (James D. Pawley, Editor).

A confocal imaging system with confocal illumination through an aperture plate and electronic scanning by a matrix detector was first proposed in DE 40 35 799. A matrix detector is employed here in which the pixels are light sensitive only one a portion (30%) of the surface assigned to the pixel, and on the illumination side, an aperture plate is typically used which has the same number of holes as the imaging sensor has light-sensitive pixels. The information in depth is gained by recording multiple images from different focus planes and individually evaluating the brightness maximum for the different pixels in a computer.

Document DE 196 48 316 describes an arrangement which is typically provided with one illumination hole on the aperture plate for every four detector pixels assigned to it, and with a prism array immediately in front of the matrix detector. The prism array acts as a beam-forming element which splits the light of each illumination point such that two crescent images are formed outside the focus. Document DE 196 51 667 A1 describes an arrangement in which likewise typically one illumination hole on the aperture plate is assigned to four detector pixels each and which contains an array of anamorphote lenses immediately in front of the detector array. One lens is assigned to each illumination hole. Here the anamorphote lenses also act as beam-forming elements producing an image of the illumination point, the image being circular in focus and oval outside of focus. In these last two arrangements, the information in depth is gained by evaluating the difference between light signals of adjacent pixels.

Arrangements DE 40 35 799, DE 196 48 316 and DE 196 51 667 A1 have the advantage, among others, that many measurement points in depth may be recorded simultaneously, yet have the disadvantage that color images cannot be recorded. The object of the present invention is therefore to disclose an approach by which images may be recorded confocally using available color-capable matrix detectors. This requirement is found for example, in genetic technology, cancer research and cancer screening where there is a need within a short period to scan many tissue cells for small (e.g. 200 nm) fluorescing or dyed sites in three dimensions.

SUMMARY

The invention provides for arranging one aperture plate each, both on the illumination side and on the observation side, in those planes which are optically conjugate with the focus plane of the object and arranging at a suitable distance a color-capable matrix detector behind the aperture plate on the observation side, i.e. outside of focus.

The diagrams show examples of possible practical embodiments of the invention.

BRIEF DESCRIPTION OF THE DRAWINGS

FIGS. 2, 2b and 2c show a compact assembly with two aperture plates, beam splitter cube and color-capable matrix radiation detector which are employed according to the invention.

FIGS. 4a and 5a show two color cell embodiments for the matrix detector.

FIGS. 4b and 5b show the spectral light transmission curves assigned to the color cells for the light filter elements arranged in front of the pixels.

FIG. 6 shows an example of an arrangement for a matrix detector (17) at a suitable distance from the plane of the confocal observation diaphragms.

FIG. 7 shows a top view of the three sensor cells of the matrix detector in FIG. 6.

DESCRIPTION

Figure 1:
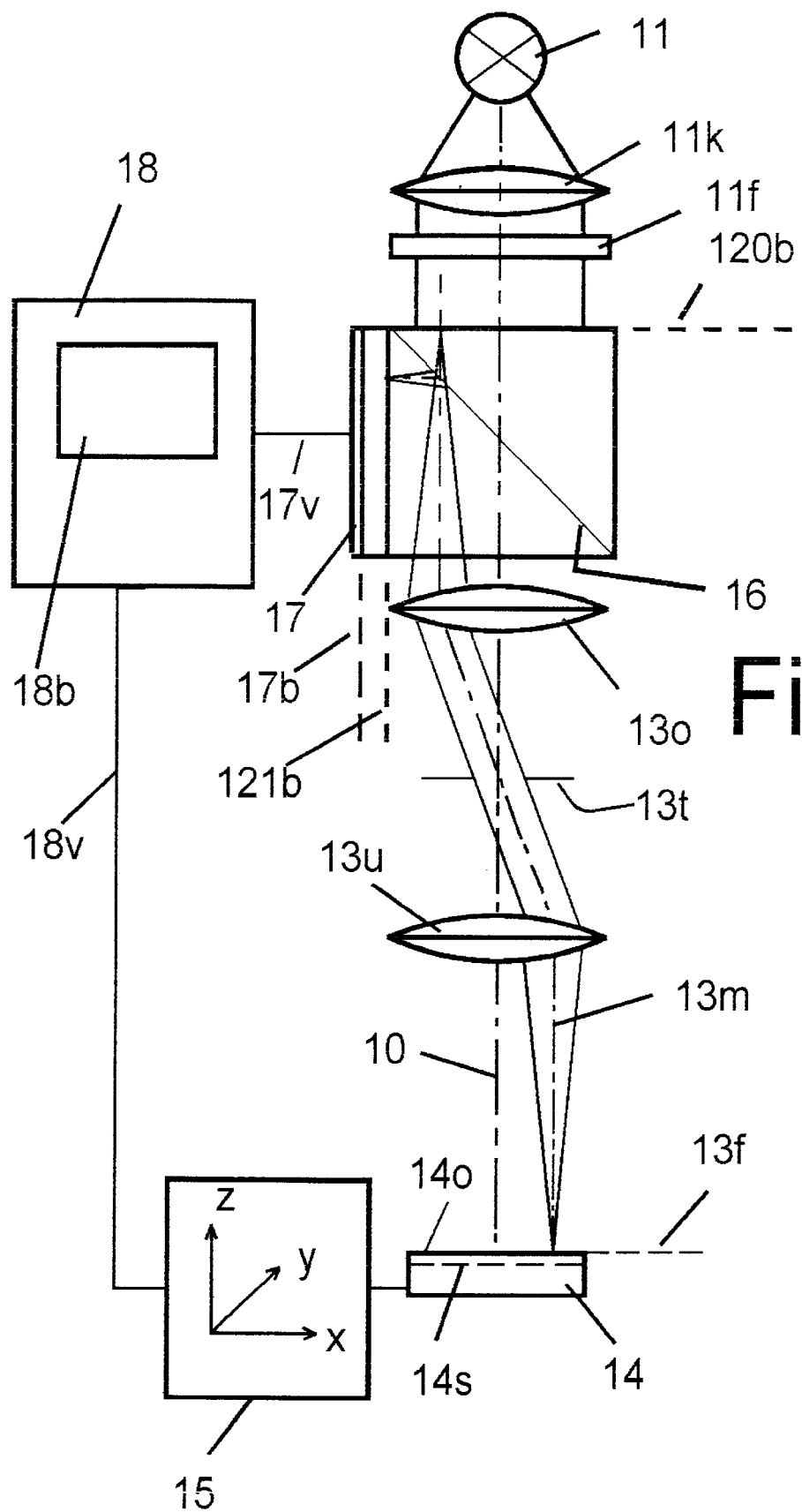
FIG. 1 shows a complete arrangement of an imaging device according to the invention.

In FIG. 1, (11) indicates a light source, e.g. a halogen lamp which with the aid of condenser (11k) illuminates holes in a layer. This layer may be fabricated in the familiar fashion, e.g. from chromium on a glass plate (12g). The holes are arranged in the layer in a grid pattern. For example, the layer contains 256×256 holes spaced 22 µm apart with the holes measuring, e.g., 4 µm×4 µm. The holes are, in other words, considerably smaller than their spacing. The spacing of the holes or the distances from center to center are designated as the grid dimension.

The illumination grid generated through the illuminated holes in the layer lies in observation plane (120b). Said plane is projected through lenses (13o, 13u) onto focus plane (13f) such that within this plane, object (14) is illuminated with light points arranged in a grid pattern. In the case of nontransparent objects, only surface (14o) can be illuminated, whereas with transparent objects, internal layers (14s) may be illuminated by light points. The light beams reflected from the object in focus plane (13f) are focused by lenses (13u, 13o) via a beam splitter (16) in diaphragm plane (121b).

The above-mentioned beam splitter (16) is designed as a semitransparent mirror and used for incident-light applications. For fluorescence applications, a dichroic mirror is employed in the known fashion.

Object (14) may be moved in all 3 spatial axes by adjustment device (15) so that different layers (14s) and different areas of object (14) may be scanned. The distance for motion in the x and y axes may be selected to be smaller than that for the grid dimension of the light points. Of course, movement of object (14) in the z axis may also be achieved by moving lenses (13o, 13u) in the direction of optical axis (10); similarly, instead of moving the object in the x and y axes, the layer with the holes and detector array (17) may also be moved in the appropriate manner.

The signals from detector array (17) are transmitted through connector line (17v) to computer (18) which effects the evaluation in the familiar manner and displays the results of evaluation on screen (18b), e.g. in the form of graphical representations. Via connector line (18v), computer (18) can also control the displacement of focus plane (13f) in the object as well as scanning in the x and y axes. This control may be present in the computer in the form of a fixed program or may proceed in response to the results of the evaluation.

FIG. 2 shows how two aperture plates (120), (121) according to the invention and matrix detector (17) may be combined with beam splitter cube (20) in one compact assembly. In the example shown, the aperture plate patterns are placed directly onto the surfaces of the beam splitter cube. Beam splitter layer (16) within the beam splitter may have an identical beam-splitting factor of e.g. 50% for all wavelengths of light, or the layer may be designed as a dichroic layer, e.g. for fluorescence applications.

FIG. 2b shows the beam splitter cube from View B, i.e. reproduces the aperture plate pattern of the illumination plane. It is of course obvious that there are in reality many more holes than shown in the example grid with 6×6 holes. Typically, 512×512 holes are used. In practice, the hole pattern is adapted to the matrix of the radiation detector on the detector employed.

FIG. 2c shows the beam splitter cube from View C where the matrix detector itself is omitted here to reveal the aperture plate pattern of the observation plane. This pattern is designed with the same grid dimension and same number of holes as the aperture plate pattern of the illumination side. This results in a confocal beam path for each of the parallel beam paths. In other words, e.g., 512×512=262144 image points are simultaneously recorded in color and confocally. This parallel arrangement of a large number of beam paths enables the rapid recording of large sample volumes. For example, it allows many suspected cancerous cells, in which the genes have been provided with specific markers, to be rapidly examined for the presence or absence of the markers within individual cells.

Methods for the specific marking of cancer genes have been developed recently. See, e.g., the inaugural dissertation "Spectral Karyotypization and Comparative Genomic Hybridization—New Methods for the Comprehensive Analysis of Chromosomal Aberrations in Clinical Genetic Diagnostics and Tumor Genetics" by E. Schrock, Humboldt University, Berlin.

Figure 3A:
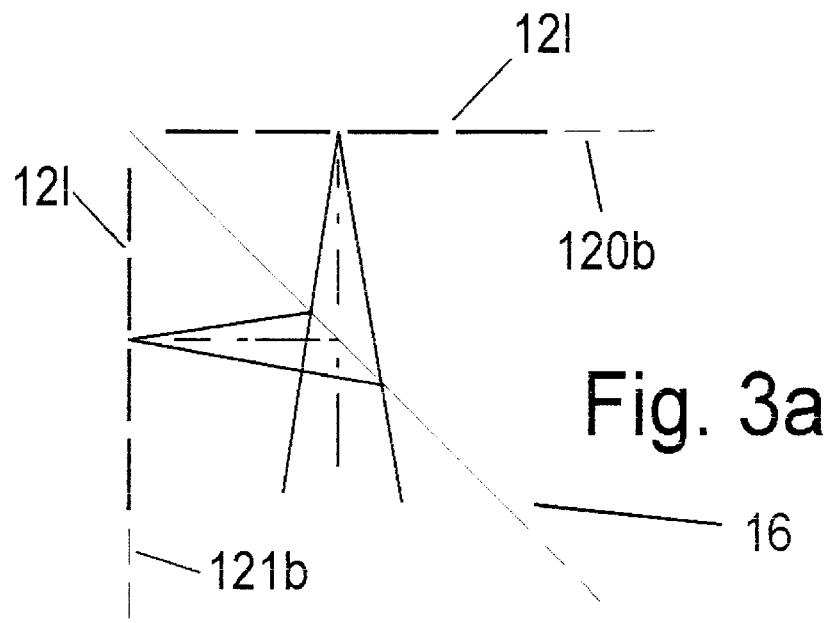
FIGS. 3a, 3b and 3c show the beam path within the beam splitter cube at various focus positions.

FIGS. 3a, b and c illustrate the confocal effect. FIG. 3a shows the beam path within the beam splitter cube for one of the parallel beam paths, the assumption being made that the associated object point is located in the focus. All light emitted from illumination plane (120b) and reflected from the object point passes through the associated hole within observation plane (121b). The sensor located left of plane (121) and not shown here thus receives considerable light for this picture element.

Figure 3B:
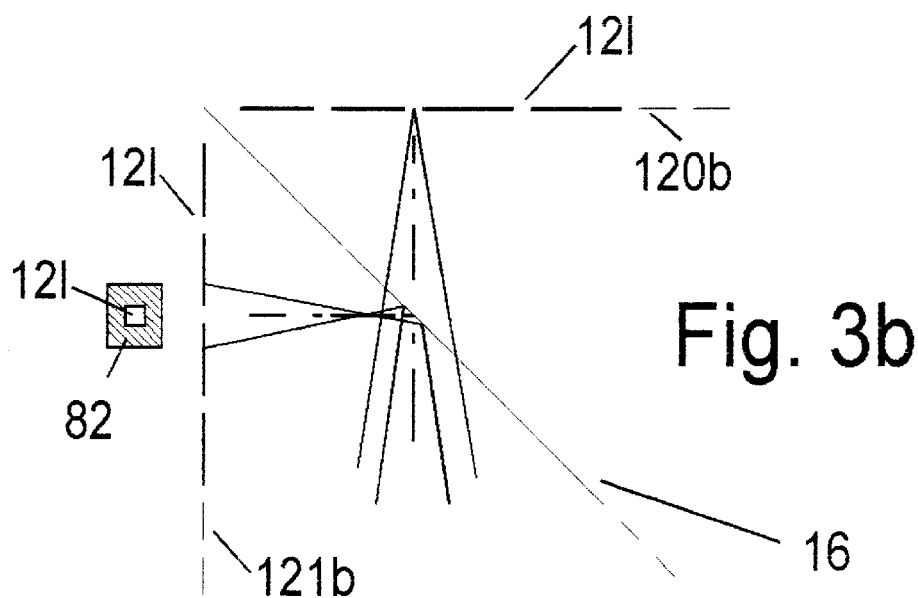

FIG. 3b similarly shows the beam path within the beam splitter cube for one of the parallel beam paths, the assumption made here being that the associated object point lies outside of focus. Only a portion of the light emitted from illumination plane (120b) and reflected from the object point can pass through the associated hole in observation plane (121b). The image of the object point created in plane (121) is shown diagrammatically at left. The hatched area indicates which portion of the light has been dimmed. The sensor located left of plane (121) and not shown thus receives less light for this picture element than was the case in focus.

Figure 3C:
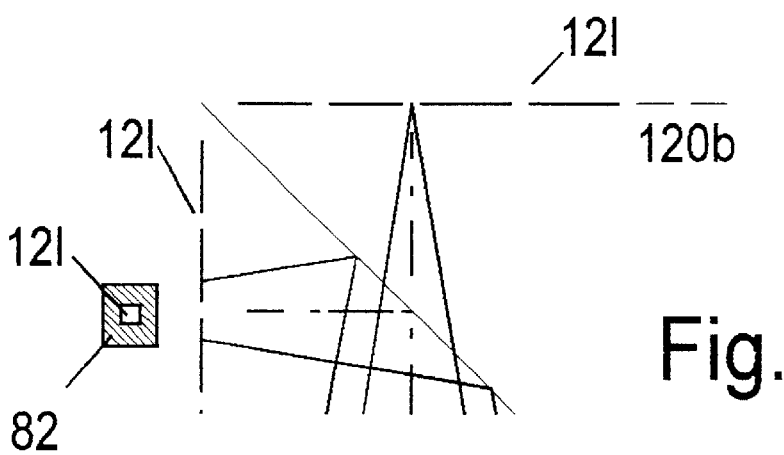

Whereas in FIG. 3b the assumption is made that the object point lies closer to the objective than would be appropriate for the focus position, in FIG. 3c the assumption is made that the object point lies further away from the objective than the focus plane. The dimming effect is, as shown at the left of the diagram, the same as for the deviation shown in FIG. 3b.

FIG. 4a shows sensor cell (17a) to which various and independently selectable light-sensitive regions of the matrix detector are assigned and in front of which are positioned light filters A, B, C, D. Light filters A, B, C, D have different spectral light transmission curves which are shown in FIG. 4b.

FIG. 5a shows another design for sensor cell (17a), again to which various and independently selectable light-sensitive regions of the matrix detector are assigned, The arrangement of the light filters shown here is taken from the datasheet for the matrix detector ICX084AK manufactured by Sony. Here the partial surfaces designated as Gb and Gr have a spectral detector characteristic designated as G in FIG. 5b. Gb and Gr belong to different lines of the matrix detector. The light-sensitive regions of the matrix detector designated as B (blue) and R (red) have the associated transmission curves B and R shown in FIG. 5b.

FIG. 6 illustrates a practical arrangement for the spacing of the matrix detectors behind the detector-side hole pattern. This spacing is a function of the aperture angle α of the imaging optics and the hole spacing on the aperture plates. In one practical arrangement of the invention—as mentioned—the hole spacing on the aperture plates is the same as the spacing used for the detector cells on the matrix array. To ensure that a complete color evaluation is possible when recording the color for each sample site illuminated, the light passing through the associated observation hole must be distributed to all partial surfaces of the sensor cell. The diverging lines (22a, 22b) show that the light to the left of the aperture plate plane is distributed onto a surface which becomes larger with distance. According to the invention, it is useful to arrange the matrix detector at such a distance s from aperture plate plane (121b) that detector plane (17b) coincides with the intersecting points of the diverging marginal rays (22a, 22b) of the adjacent holes. In this way, the detector cells are fully illuminated and the color characteristic of the sample points may be measured completely.

The component of color detector array (17) belonging to the arrangement shown in FIG. 6 is reproduced (view rotated by 90 degrees) for purposes of further illustration.

The arrangement is not limited to the use of color-capable matrix sensors. In place of the cells to record four different spectral ranges, individual correspondingly larger pixels of a black-and-white sensitive matrix sensor may be employed, the pixels being light-sensitive over their entire surface. In this embodiment, the invention is employed for confocal imaging with matrix sensors in which the pixels are light-sensitive over the entire surface allocated to them.

It is also not necessary, although it is practical, that the grid dimension of the matrix sensors be the same as, or integer multiples of, the grid dimension of the aperture plates. The confocal effect is produced by the two aperture plates. The grid dimension of the matrix sensors may thus in principle deviate as desired from the grid dimension of the aperture plates. However, the result of this may be aliasing effects and other image artifacts which could cause distortions under certain circumstances.

What is claimed is:

1. An apparatus for examining an object in three dimensions, said apparatus comprising:

a illumination source; and an optical system having an illumination side and an observation side, said optical system including:

an illumination grid located in an illumination plane on the illumination side of the optical system and which when illuminated by the illumination source generates an array of illumination points that is projected by said optical system onto an object focus plane where the object is located, said optical system in turn directing light from that object focus plane into an observation focus plane on the observation side of the optical system, said illumination grid comprising a first aperture plate having a first passive array of pinholes;

an array of detector cells located on the observation side of the optical system, each of the cells of the detector array having n independently selectable light-sensitive regions, wherein n is an integer greater than 1; and a second aperture plate located between the detector array and the optical system, said second aperture plate having a second passive array of pinholes, wherein each of the pinholes of the second aperture plate is associated with a corresponding different detector cell of the detector array.

2. The apparatus of claim 1, wherein the second aperture plate is located in the observation focus plane.

3. The apparatus of claim 2, wherein the n light-sensitive regions of each cell include n different spectral filters, each of the n spectral filters being associated with a different one of the n light-sensitive regions.

4. The apparatus of claim 3, wherein n=4.

5. The apparatus of claim 2, wherein the detector array is positioned a specified distance from the second aperture plate so that an unfocused image of an illumination point for each pinhole of the second aperture plate fully illuminates the corresponding cell.

6. The apparatus of claim 2, wherein the first passive array of pinholes has the same dimensions as the second passive array of pinholes.

7. The apparatus of claim 2, wherein the n light-sensitive regions of each cell are characterized by n different spectral sensitivity curves.

8. An optical system for examining an object in three dimensions, said optical system having an illumination side and an observation side and comprising:

a transparent block that includes a beam splitter embodied therein;

an illumination source grid located in an illumination plane on the illumination side of the optical system and which during use generates an array of illumination points that is projected by said optical system onto an object focus plane where the object is to be located, said optical system in turn directing light from that object focus plane into an observation focus plane on the observation side of the optical system, said illumination grid comprising a first aperture plate having a first passive array of pinholes;

an array of detector cells located on the observation side of the optical system; and a second aperture plate located between the detector array and the optical system, said second aperture plate having a second passive array of pinholes, wherein both the first aperture plate and the second aperture plate are attached to corresponding surfaces of the transparent block.

9. The optical system of claim 8 wherein each of the cells of the detector array have n independently selectable light-sensitive regions, wherein n is an integer, and wherein each of the pinholes is associated with a corresponding different detector cell of the detector array.

10. The optical system of claim 9 wherein n=1.

11. The optical system of claim 8, wherein the n is greater than 1 and the n light-sensitive regions of each cell are characterized by n different spectral sensitivity curves.

12. The apparatus of claim 8, wherein the second aperture plate is located in the observation focus plane.

13. The optical system of claim 8, wherein the first aperture plate and the second aperture plate are formed on corresponding surfaces of the transparent block.

* * * * *